United States Patent [19]

McKeen et al.

[11] 4,078,549
[45] Mar. 14, 1978

[54] SOLAR ENERGY COLLECTOR

[76] Inventors: Thomas Ray McKeen, 2734 Wilborn Dr., San Antonio, Tex. 78217; Ronald Bart Stephenson, 5115 Casa Rica, San Antonio, Tex. 78233

[21] Appl. No.: 711,723

[22] Filed: Aug. 5, 1976

[51] Int. Cl.² ............................ F24J 3/02; F03G/7/02
[52] U.S. Cl. .................................... 126/271; 126/270; 60/641; 237/1 A
[58] Field of Search ..................... 126/270, 126/271; 237/1 A; 60/641; 248/317, 323–325; 250/203, 491

[56] References Cited

U.S. PATENT DOCUMENTS

| | | | |
|---|---|---|---|
| 1,345,758 | 6/1920 | Folsom | 126/271 |
| 1,814,897 | 7/1931 | Coxe | 126/271 |
| 2,182,222 | 12/1939 | Courtis et al. | 126/270 |
| 3,868,823 | 3/1975 | Russell, Jr. et al. | 60/641 |

Primary Examiner—Kenneth W. Sprague
Assistant Examiner—Larry Jones
Attorney, Agent, or Firm—Gunn & Lee

[57] ABSTRACT

The solar energy collector concentrates the sun's rays on a liquid medium that is used to power a mechanical energy device such as a positive displacement steam engine. A reflective surface of the solar energy collector is made from an arcuate portion of a circle having a trough-like surface to reflect and concentrate the sun's rays in a plane. A collector having a liquid medium flowing therethrough is located in the plane. The collector is constructed to extend across the entire plane for complete absorption by the liquid medium of the sun's rays reflected from the reflective surface. The collector and reflective surface are connected together for pivotal movement by an appropriate tracking apparatus so that the sun's rays are continually reflected during normal daylight hours through the plane in which the collector is located.

10 Claims, 5 Drawing Figures

SOLAR ENERGY COLLECTOR

BACKGROUND OF THE INVENTION

This invention relates to a solar energy collector and, more particularly, to a solar energy collection system wherein the reflector is formed from an arcuate portion of a circular cylinder trough-like surface to reflect the sun's rays through a plane in which a collector having a suitable fluid medium flowing therethrough is located. The fluid medium heated by the sun's reflected rays is used to drive a mechanical energy device. An appropriate tracking mechanism is used to control pivotal motion of the reflector and collector so that the sun's rays continually reflect from a reflective surface through the plane in which the collector is located.

BRIEF DESCRIPTION OF THE PRIOR ART

Prior to the present invention, many systems have been devised for the utilization of solar energy as a source of power. Of the prior systems utilizing a reflective surface for concentration the sun's rays, the reflective surface normally had a parabolic trough-like surface that reflected the sun's rays along a focal line. These prior devices spent considerable time and effort to accurately locate the focal line by detailed, expensive reflective surfaces. The forming of the reflective surface by bending of reflective material so that the sun's rays would reflect along a focal line was very difficult and expensive. Other methods of forming the reflective surface were equally difficult and expensive. It was very critical that the absorption device be accurately located along the focal line. Therefore, prior solar energy collectors that utilized parabolic trough-like surfaces were not only very expensive to manufacture, but were also hard to maintain under normal environmental conditions because of the accuracy required.

In U.S. Pat. No. 3,868,823, a series of reflective slats were arranged along an arcuate, trough-like surface to reflect the sun's rays to a focal line. Such a configuration is expensive because each individual slat must be accurately positioned to reflect the sun's rays along the focal line. A conduit carrying the fluid medium to be heated was located along the focal line. The conduit was continually moved to maintain the conduit along the focal line.

Many other types of solar energy collectors that do not use a concentration of the sun's rays by reflection have been devised and used in the past; however, these devices do not produce the high temperatures necessary for the proper utilization of the sun's energy.

SUMMARY OF THE INVENTION

The present invention uses an arcuate portion of a cylinder forming a trough-like reflector for reflecting and concentration the sun's rays through a plane. In the plane is located a collector which abosrbs the sun's energy. The collector includes a conduit for flowing a suitable fluid medium therethrough (such as water). The entire collector is rigidly mounted to the supporting structure which also supports the reflector. If the conduit is not large enough to encompass the entire plane, suitable heat conductive material may extend outward from the conduit to properly absorb all of the sun's reflected rays. Insulation material around the conduit reduces heat loss by the fluid medium.

The collector and reflector are mounted on common supporting superstructure so that they may be pivoted together. The superstructure is particularly designed to rest on the earth's surface and to pivot on the supporting rockers for the reflector. Pivotal motion of the reflector and collector is controlled by a light detection device with suitable control mechanism for driving a motor. The motor is connected to the supporting superstructure by pulling cables and counterweights to simultaneously pivot the reflector and collector thereby maintaining the collector in the plane of the sun's reflected rays.

If the fluid medium used is water, it will vaporize in the collector and feed to an engine such as a piston operated steam engine. The piston operated steam engine transforms the energy from the steam into mechanical energy for work. A storage tank is used for collecting the condensed water from the steam engine for subsequent recirculation through the collector.

The reflective surface of the present invention is particularly economical to build because the skeleton frame (previously referred to in general as superstructure) supporting the reflective surface is made from standard steel pipe bent along the radius of a circle. The reflective surface attached to the steel pipe may be standard size sheets of galvanized metal having a reflective film. The collector is also made from standard inexpensive components, such as sheet metal, heat absorbing metal, conduit, protective glass and sheet insulation material.

DESCRIPTION OF THE PREFERRED EMBODIMENT

Figure 1:
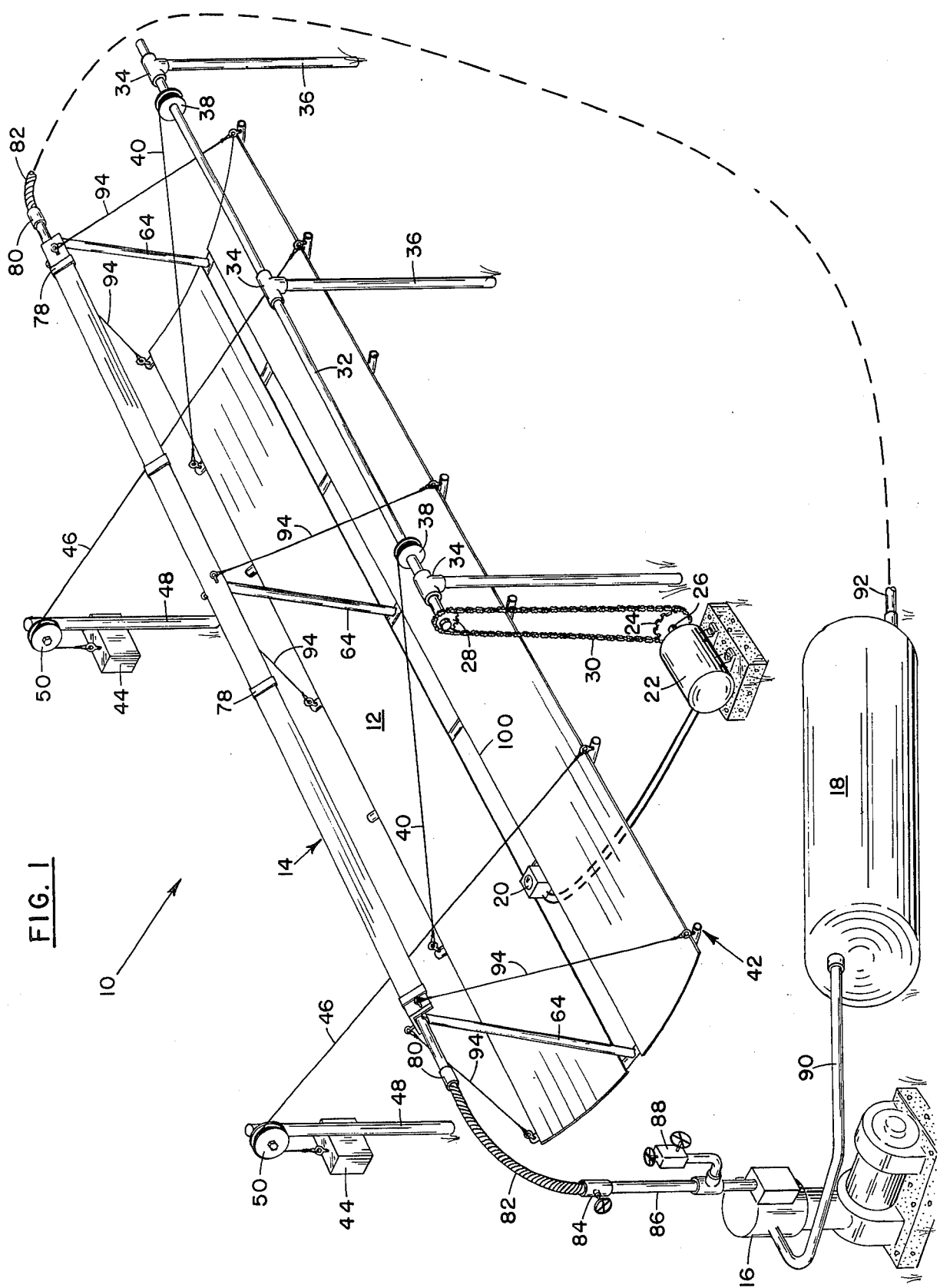
FIG. 1 is an illustrative, perspective view of the solar energy collector being used as a source of power.

Referring now to FIG. 1, there is shown a solar energy collector system represented generally by the reference numeral 10. The solar energy collector system 10 has a circular arc shaped reflective surface 12 formed in two parts that both reflect the sun's rays to a collector 14. A fluid medium (normally water) flows through the collector 14. If water is used, the water is evaporated and used to drive a positive displacement steam engine 16. Water condensed into the positive displacement steam engine 16 is collected in tank 18 and recirculated through the collector 14.

A standard light sensing mechanism 20 is used to detect the sun's rays. When the sun is not directly overhead, the light sensing mechanism 20 will connect the motor 22 to a source of electric power (not shown). In response to a control signal from the light sensing mechanism 20, the motor 22 will reposition the solar energy collector system 10 by means of gear 24 on drive shaft 26 that connects to gear 28 via chain 30. Gear 28 is rigidly connected to conduit 32, which conduit 32 is pivotally supported through T-connectors 34 of posts 36. Also rigidly connected to conduit 32 are spools 38. Drive cables 40 are connected to the opposite side of the skeleton frame 42 which supports the reflective surfaces 12. A portion of the drive cables 40 is wound on spools 38 with the ends being anchored thereto.

Counterweights 44 are connected through counterweight cables 46 to the opposite of the skeleton frame 42 from the connection by drive cables 40. The counterweights 44 are supported by post 48 via pulleys 50. The pulleys 50 are free to rotate in response to movement of counterweight cables 46 therethrough.

Figure 2:
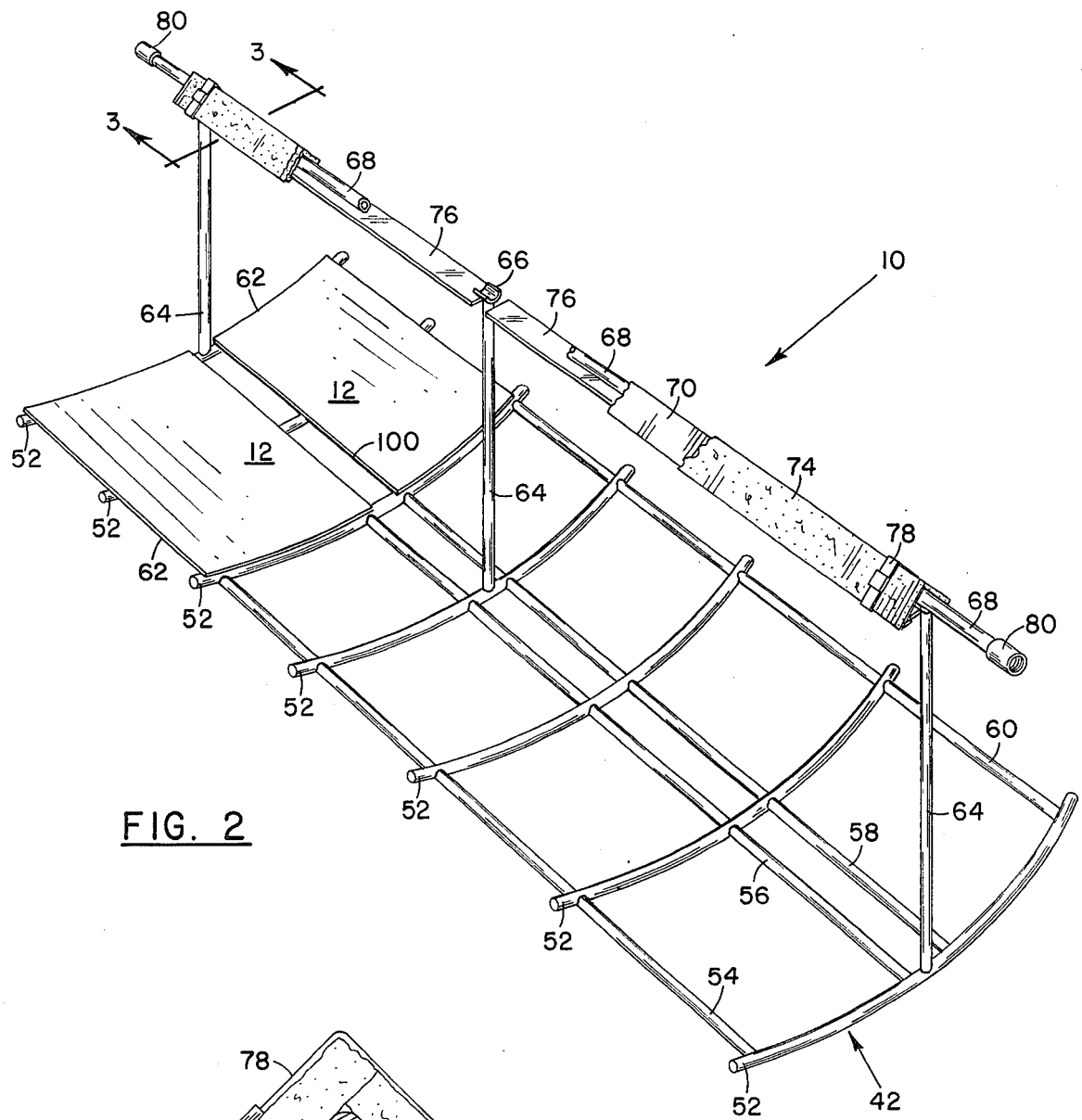
FIG. 2 is a perspective view of the solar energy collector during assembly with portions cut away to better illustrate construction.

Referring now to FIG. 2 of the drawings, details of the construction of the solar energy collector system 10 is shown in more detail. The skeleton frame 42 has a series of rockers 52 made from standard steel pipe bent along the arc of a circle. Each of the rockers 52 is connected together by horizontal cross-support bars 54, 56, 58 and 60. Connection between the rockers 52 and horizontal cross-support bars 54, 56, 58 and 60 may be by any suitable means, such as welding. The horizontal cross-support bars 54, 56, 58 and 60 may be made from any suitable material, such as standard steel pipe. The horizontal cross-support bars 54, 56, 58 and 60 do not extend above the rockers 52 so that a true arcuate plane is provided by the upper surfaces of rockers 52.

Though the spacing of the rockers 52 and the horizontal cross-support bars 54, 56, 58 and 60 may vary, in this preferred embodiment they have been specifically designed so that a standard 4 × 10' sheet of 22 gauge galvanized metal may be attached thereto. Because of the flexibility of 22 gauge sheet metal, the sheet metal 62 bends along the same arc as rockers 52. Thereafter, the sheet metal 62 is connected by any convenient means, such as screws or welding, to rockers 52 as can be seen in FIG. 2. Also, the standard size sheet metal 62 may connect by conventional means along the edges of its longitudinal axis to horizontal cross-support bars 54, 56, 58 and 60. This provides a very rigid structure for the reflective surfaces 12, which reflective surfaces 12 may have a reflective film applied thereto. This process is repeated until the entire skeleton frame 42 is covered with standard size sheet metal 62 to form the reflective surfaces 12 as previously shown in FIG. 1.

Extending upward from the rockers 52 between horizontal cross-support bars 56 and 58 are struts 64. The struts 64 may be connected by any suitable means, such as welding, and may be formed from any suitable material, such as steel pipe. Each of the struts 64 are of the same length and have a U-shaped support 66 attached to the upper end thereof. The U-shaped support 66 supports a heat absorbing conduit 68 which fits in support 66. The heat absorbing conduit 68 must be made from a heat conductive material that will readily absorb and transfer energy to the fluid medium flowing therethrough.

Figure 3:
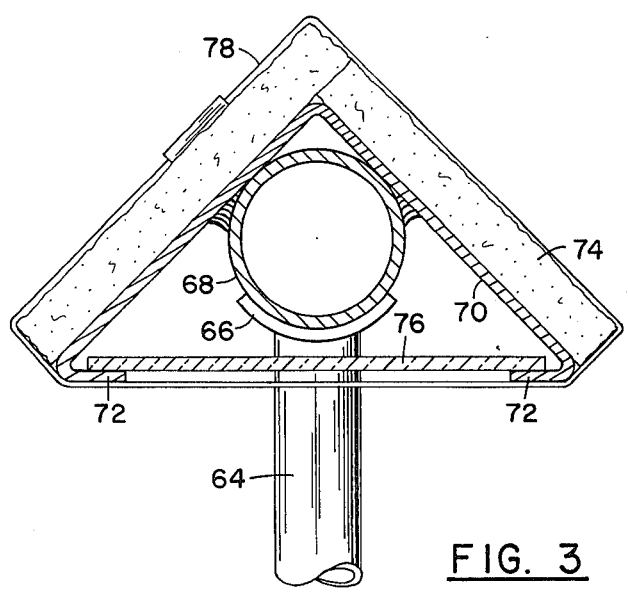
FIG. 3 is a cross sectional view of FIG. 2 along section lines 3—3.

Since the heat absorbing device 68 in this preferred embodiment does not cover the entire plane through which the sun's rays are reflected (which will be described in more detail subsequently in conjunction with FIGS. 4 and 5) heat conductive sheet metal 70 is located above heat absorbing conduit 68 and is resting thereon as shown in FIG. 3. The heat conductive sheet metal 70 has an upper bend of approximately 90° so that it drapes downward on either side of the heat absorbing conduit 68. The heat conductive sheet metal 70 has lower inward flanges 72 for supporting plate glass 76. The heat conductive sheet metal 70 must transfer heat received from the sun's rays to the heat absorbing conduit 68 by any suitable means. While the heat conductive sheet metal 70 may transfer heat by direct contact with the heat absorbing conduit 68, the preferred method of construction would include attachment of the sheet metal 70 to the heat absorbing conduit 68 by any suitable means for better heat conduction. One method of attachment would be to bond the sheet metal 70 to the heat absorbing conduit 68 by a heat conductive adhesive. To prevent energy losses due to wind or other environmental factors, sheet insulation material 74 is placed on the upper surfaces of the heat conductive sheet metal 70. Also to prevent energy loss, plate glass is held into position by lower inward flanges 72 of the heat conductive sheet metal 70 with the plate glass located below the heat absorbing conduit 68 between each of the supporting struts 64.

To hold the sheet insulation material 74 securely into position, straps 78 are secured at intervals along the heat absorbing conduit 68. It should be realized that the insulation material 74 may be held into position by other means, such as gluing.

On each end of the heat absorbing conduit 68 is located an appropriate fitting 80 for connection to flexible conduit 82 as shown in FIG. 1. Because the flexible conduit 82 must withstand high pressure, a steel braided reinforced flexible conduit has been found to be particularly suitable for these conditions. The flexible conduit 82 connects by means of valve 84 and conduit 86 to the positive displacement steam engine 16. A relief valve 88 is provided to prevent pressures in excess of a predetermined amount. From the steam engine 16, condensed water and vapor feeds through conduit 90 to the storage tank 18. From the storage tank 18, water feeds back through conduit 92 to the heat absorbing conduit 68. To prime the system, it may be necessary to include a small pump along conduit line 92 to start water flow through the heat absorbing conduit 68. The mechanical energy from the steam engine 16 may be used to drive any particular load or perform work. A typical such example would be the use of steam engine 16 to operate a water well for irrigation.

It should be understood that the overall system shown in FIG. 1 is for illustrative purposes to show an operative system. Other items not shown, but may be included for greater efficiency, could be a condenser and vacuum pump after the engine 16 and a pump (commonly called a boiler feed pump) between the tank 18 and heat absorbing conduit 68. Also, it may be desirable to have the heat absorbing conduit 68 (sometimes called a water tube boiler) feeding into a surge tank or dome-shaped steam drum, which may also function as tank 18.

To allow for remote operation of the solar energy collector system 10, the engine 16 may also operate a generator (as well as perform other work), which generator would supply electric power necessary to operate any other motor, pumps, etc. of the system. The generator may charge a battery to provide energy during start-up as well as operating conditions.

Naturally, the heated fluid medium (normally steam) created via the heat absorbing conduit 68 may be used for other forms of energy, such as commercial heating or cooling.

Figure 4:
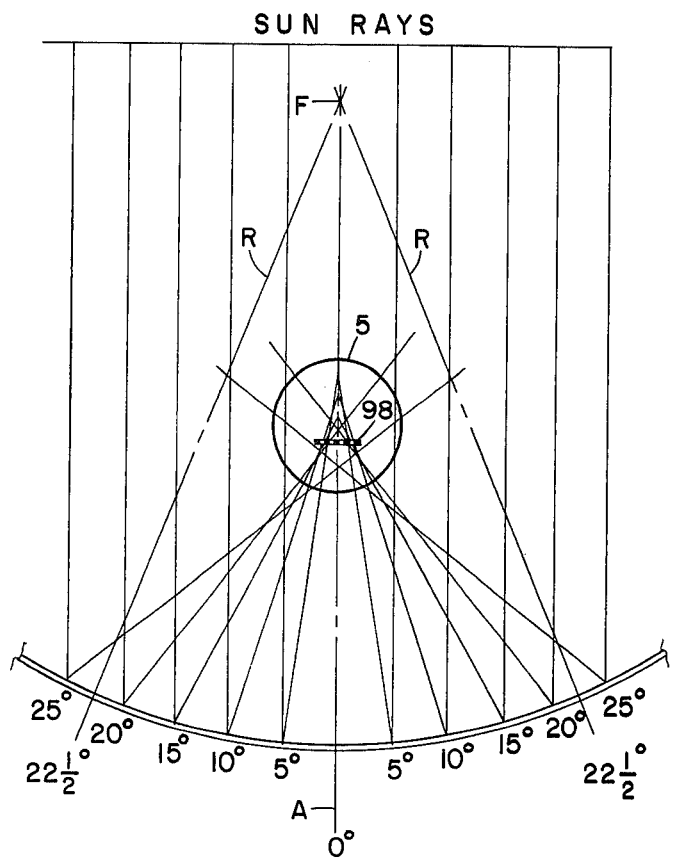
FIG. 4 illustrates the reflection of the sun's rays from an arcuate surface when the sun is directly overhead.
Figure 5:
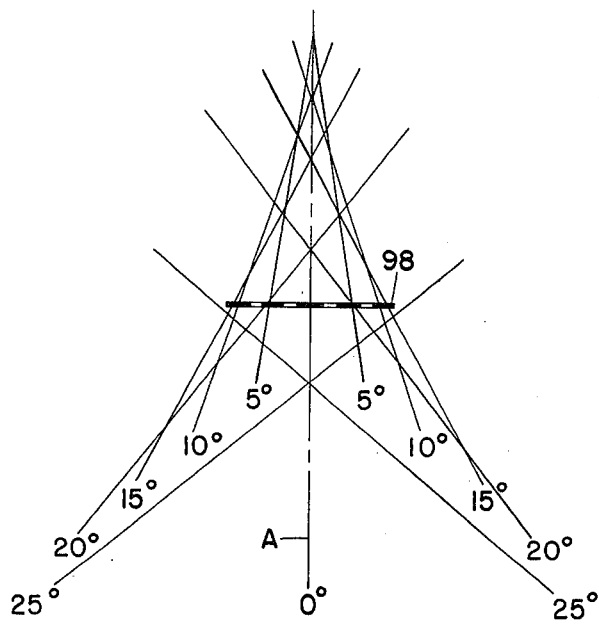
FIG. 5 is an enlargement of FIG. 4 inside of circle 5 to illustrate concentration of the sun's rays in a plane.

Referring now to FIG. 4 of the drawings, there is shown a cross sectional view of an arcuate surface 96 with the sun's rays located directly thereabove. Arcuate surface 96 has a radii R about point F. At all places in this patent application, when the words "arc" or "arcuate" are used, they are referring to a portion of a circle. Considering only the portion of the arcuate surface 96 that is located 22½° on either side of the perpendicular axis A, it can easily be seen that the sun's rays are reflected through a plane represented by dotted line 98. The reflected sun's rays do not converge on a single focal point. An enlargement of the area including the plane 98 is contained in FIG. 5, which enlargement is the area included in Circle 5 of FIG. 4. A conservative estimate of the concentration of the reflected sun's rays from the arcuate surface 96 to the plane 98 would be a factor of approximately 30 to 1. Under good conditions, a concentration factor of 45 to 1 can be obtained. Therefore, any heat absorbing device located in plane 98 would receive approximately 30 times the sun's rays as would be received from direct radiation.

Through calculations and experimentation, applicants have determined that if the sun's rays are perpendicular to the center tangent of the arc of reflective surface 12, the most desirable location for plane 98 is between 0.4 and 0.5 R above the bottom of the arc of the reflective surface 12. In the preferred embodiment, the plane 98 is located at approximately .46 R.

In the solar energy collector system 10, all of the sun's rays for a distance of approximately 22 ½° on either side of the struts 64 (with the exception of the small opening 100 along the middle of the reflective surface 12) will be concentrated in a plane where the collector 14 is located. In the present invention, since the collector 14 should be located in an entire plane and not along a single focal line, a much greater degree of latitude in construction is permissible. Also because the reflective surfaces 12 are arcuate (not parabolic), the solar energy collector system is much simpler, easier and economical to construct. The conductive sheet metal 70 located around heat absorbing conduit 68 may not be necessary for absorbing the reflected rays if the heat absorbing conduit 68 covers the entire reflective plane. If not, heat conductive sheet metal 70 may be necessary to insure that all of the reflected energy from the sun is properly transmitted to the fluid medium.

To securely hold the collector 14, including the heat aborsbing conduit, in position during pivotal motion of the solar energy collector system,tension cables are connected between the collector 14 and the skeleton frame 42 as shown in FIG. 1. Also, the small opening 100 in the reflective surface 12 has certain design advantages. Any residue such as dust on the reflective surface 12 may be washed off by rain or by a water hose. When the reflective surface 12 is pivoted to directly receive the sun's rays during early morning or lateafternoon, wind resistance is reduced by the wind flowing through small opening 100. The inclusion of the small opening 100 does not reduce the total reflective surface 12 of solar energy collector system 10 because the area of small opening 100 is shaded by the collector 14.

We claim:

1. A solar energy apparatus for concentrating the sun's rays on a fluid medium comprising:
arcuate, trough-like reflector means for reflecting and concentrating the sun's rays through a plane fixed with respect to said reflector means;
collector means located in said plane, said collector means providing conduit means for said fluid medium, said collector means being heated by the sun's reflected, concentrated rays in said plane;
stationary support means on each side of said reflector means, said stationary support means having line means connected to opposite sides of said reflector means via pulley means, motor means for turning said pulley means to adjust said reflector means with said line means to maintain said sun's rays perpendicular to a line tangent to the center of said reflector means.

2. The solar energy apparatus of claim 1 including structure means extending above said reflector means to rigidly hold said collector means in said plane, counterweight means connected through at least one of said pulley means for applying a force to one side of said reflector means which force may be overcome by said motor means.

3. The solar energy apparatus of claim 2 wherein said collector means comprises an elongated tubular conduit, said conduit having flange means continguous thereto and coextensive therewith, said flange means extending outwardly on the sides of said conduit means to encompass said fixed plane.

4. The solar energy apparatus of claim 3 wherein said flange means includes a cover draped over said tubular conduit and bonded thereto, upper surfaces of said cover being covered with insulation means, glass means being suspended below said cover means and said tubular conduit.

5. The solar energy apparatus of claim 2 wherein said structure means includes arcuate rocker supports for said reflector means, said rocker supports providing a pivot surface for said reflector means.

6. The solar energy apparatus of claim 5 wherein said structure means extends upward to support said collector means, said structure means being from standard metal pipe.

7. A solar energy system for utilizing the sun's rays to generate power comprising:
frame means;
reflector means having an arcuate, trough-like reflective surface mounted on said frame means;
collector means mounted on said frame means in a plane above said reflective surface, said plane being fixed with respect to said reflective surface, said collector means providing a heat absorbing conduit extending therethrough;
a fluid medium for flowing through said heat absorbing conduit, said fluid medium being heated in said conduit;
engine means receiving said heated fluid medium through flow means, said engine means generating mechanical energy from said heated fluid medium, said fluid medium being collected and returned to said heat absorbing conduit by said flow means;
stationary support means adjacent to said frame means, said stationary support means having line means connected to opposite sides of said frame means via pulley means, motor means for turning said pulley means to adjust said frame means and reflector means with said line means to maintain said sun's rays perpendicular to a line tangent to the center of said reflector means;
counterweight means connected through at least one of said pulley means for applying a force to one side of said frame means which force may be overcome by said motor means.

8. The solar energy system of claim 7 wherein said collector means includes flange means contiguous and coextensive with said heat absorbing conduit means to encompass said plane.

9. The solar energy system of claim 8 wherein said frame means includes rockers of the same arcuate shape as said reflector means, said rockers supporting said reflector means and providing structure on which said motor means may pivot said reflective surface via said line means.

10. The solar energy system of claim 7 wherein said reflector means has a given radius of curvature, said plane being parallel to a second plane tangent to the center of said reflective surface and between 0.4 and 0.5 times the radius above said second plane.

* * * * *